United States Patent Office 3,417,500
Patented Dec. 24, 1968

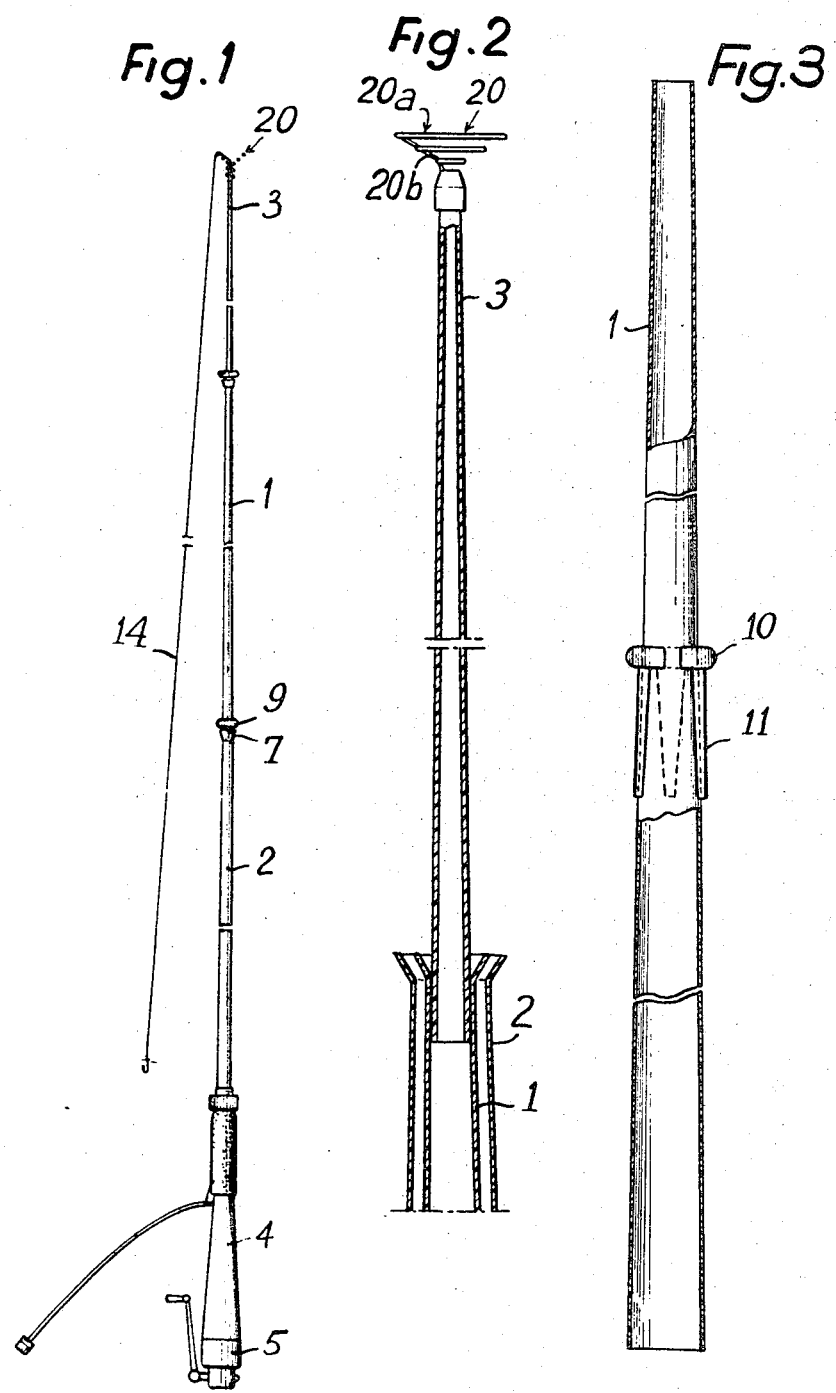

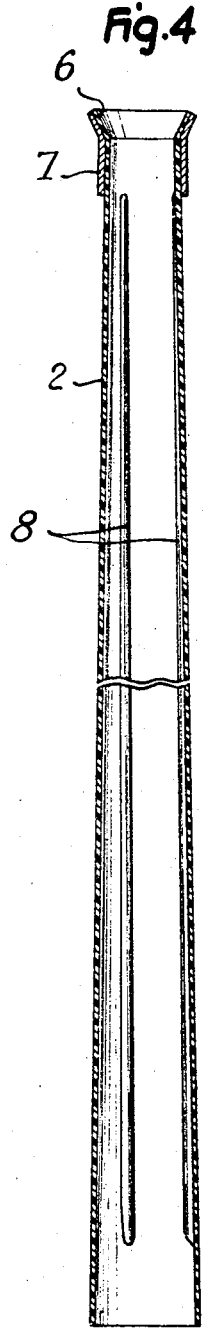
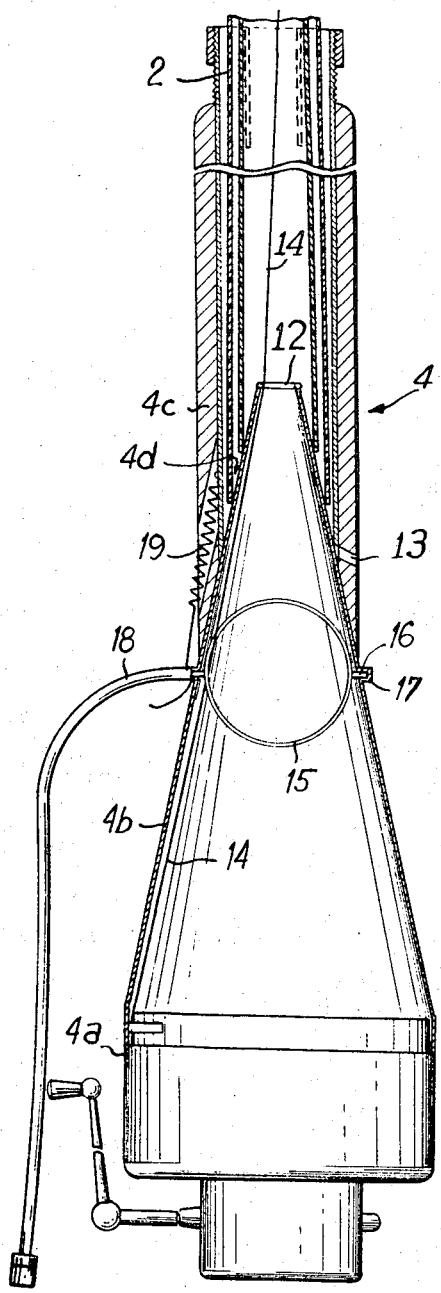

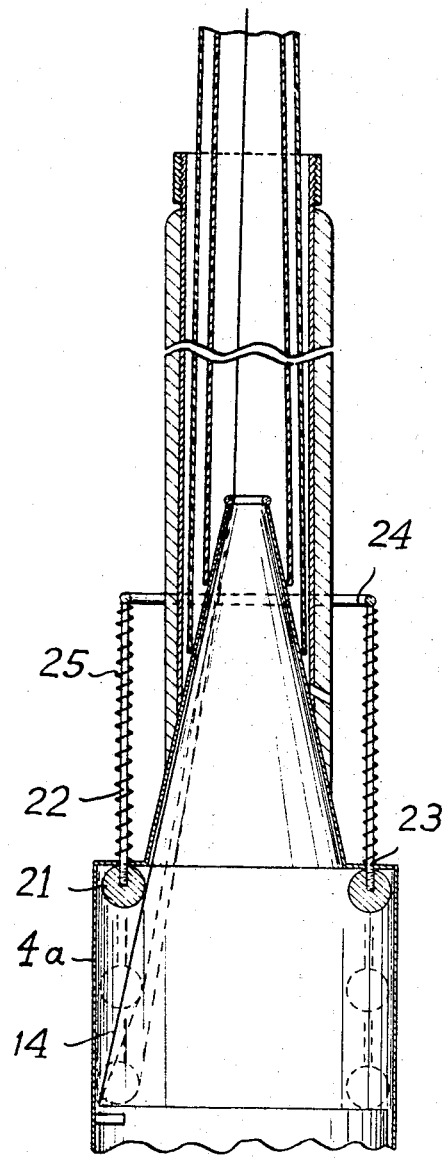

3,417,500
MULTIPURPOSE FISHING ROD
André Carabasse, 20 Rue du Tribunal,
Doullens, Somme, France
Filed June 15, 1967, Ser. No. 646,310
Claims priority, application France, June 24, 1966,
66,773; May 26, 1967, 108,113
9 Claims. (Cl. 43—18)

ABSTRACT OF THE DISCLOSURE

A multipurpose telescopic fishing rod having at least one rod section with interior guide means for the line and a removable axially hollow handle fixed thereto, the handle having a cylindrical portion carrying an internal axial reel and being extended by a truncated portion ending in a fixed ring for axial guiding of a line, such that the line, during winding and unwinding, describes an angle of no more than 75° between the ring and the reel. The truncated portion of the handle being surrounded by a substantially cylindrical portion which receives the telescoped end of the rod section is perforated to enable water collected therein to be evacuated and is provided with means for progressively braking and locking the line.

---

Figure 7:
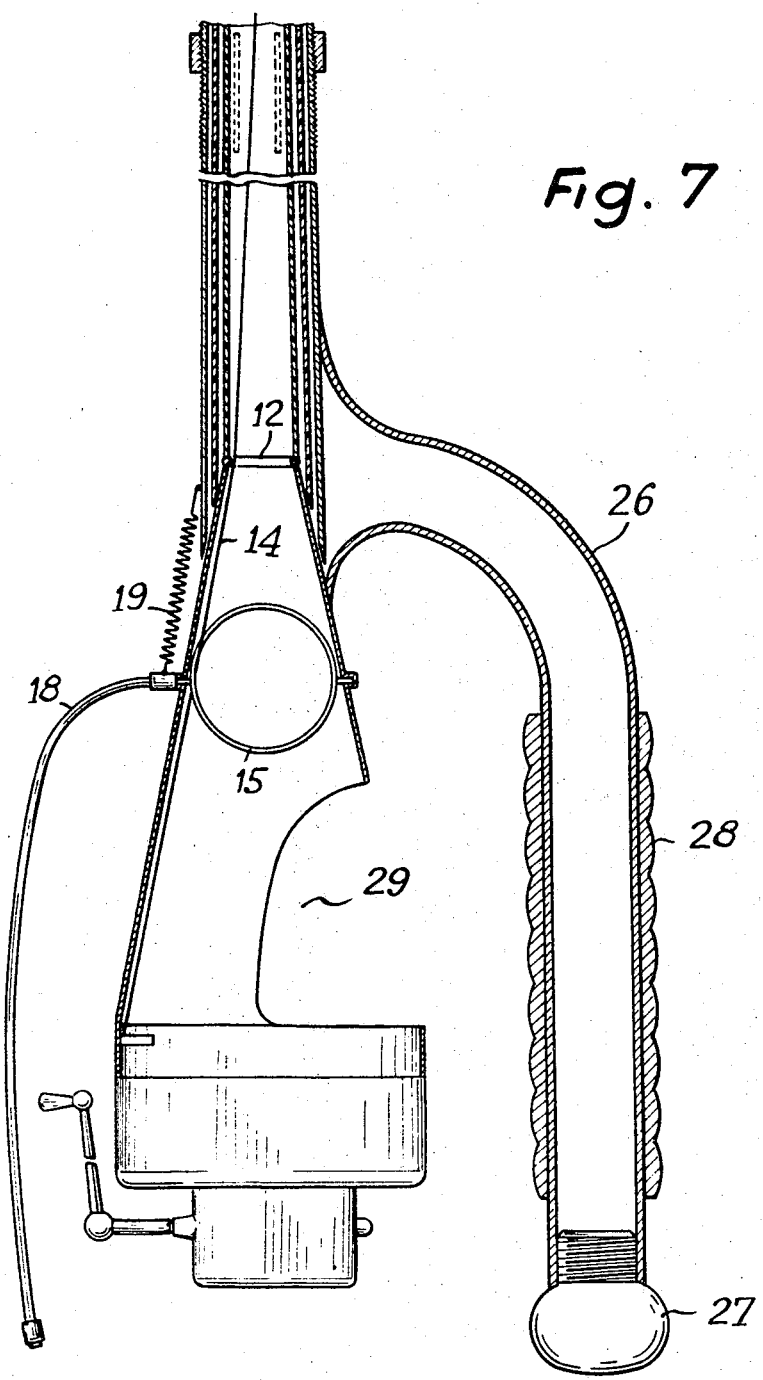

There are numerous types of commercial fishing-rods which are adapted for use in a particular type of fishing and to the rivers where they are used; there is not available at the moment a multi-purpose fishing-rod.

In general, commercial fishing-rods can be categorized as follows:

(a) Telescopic-rods having no guide-rings for the line which are used for fishing using a line caster with natural flies or grasshoppers, such rods being of from 4.5 to 6 m., and those with an internal path for the line, which are provided with a reel from which the line enters the rod by a hole made in the wall, shaped so as to lessen the inevitable friction of the line in passing therethrough and within the rod.

(b) Non-telescopic-rods having several sections, provided with external rings which enable them to be used for fishing with different types of reels having fixed or rotatable drums. They are generally speaking more rugged, heavier and less maneuverable than the aforesaid type.

(c) Light or heavy casting rods which are much shorter (in general from 1.80 to 3 m.), provided with fixed drum reels and protruding rings (for guiding the "nylon" line), of internal diameter decreasing from about 25 mm. to 4 mm. from the bottom to the top.

(d) Single handed fly-fishing rods, generally of about 2.80 to 3.20 m., which are also provided with external rings of the variable type, and also rotatable drum reels carrying a silk of a weight which is appropriate to the rod.

These rods enable normal fishing and wet and dry fly-fishing to be performed, but are little short for line casting fishing except for short distances.

(e) Rods which are maneuvered with two hands and used especially for fly-fishing for salmon in rivers, or for mackerel in the sea, and heavy casting rods used at sea for carnivorous fish.

(f) And finally line-casters having a reel disposed at the upper end of the handle, such devices being generally operated with two hands for fishing at sea with heavy lures.

All these rods have their advantages and disadvantages.

Commercial hollow fishing-rods, in which the line passes in annular guides within the rod, use the rotatable drum type reel. However, the line, cord, or silk, entering through a hole formed in the wall of the rod comes from an external reel on the rod and is therefore not axial to the rod; because of this, several more or less sharp angles are formed in the line between the point where it leaves the reel and the guides within the rod, which angles introduce a resistance to unwinding of the line. Such rods are not adapted to casting and in particular to fly-casting even if the reel is mounted in such a way that the line approaches the rear end of the rod and enters it axially.

Fishermen who fish for trout, chub or *Salvelinus alpinus*, who most often practice their sport in small or medium rivers having difficult access because of trees, rocks, and considerably varying width of the river-bed, with light or heavy casting-rods, or one handed fly-fishing-rods of the type (c) or (d), the fishing starts very early in the morning with the light casting-rod, with a deep bait such as worms, or cheese, with or without a float or water bubble, and with a fixed drum reel and continues with this equipment until the time at which flies appear which is normally later.

At this time, the light casting-rods are dismantled and fly-fishing-rods having rotary drum reels are used. One or the other type of fishing, i.e. one or the other rod, is used according to the time, the season, the local circumstances and the wishes of the fisherman.

This necessity for using two rods often creates difficulties for the fisherman under difficult conditions. The second rod encumbers and hinders him, distracting his attention from the rod which is fishing, with latter often becomes caught on thorny bushes either by the line, the lure, by the reel or by the rings. There is thus a risk of the fisherman becoming irritated, of his apparatus being broken, of time being wasted and the possibility of forgetting the other rod at the edge of the water whilst fishing, or of the rod falling into the water due to clumsiness or irritation of the fisherman.

The object of the present invention therefore is to provide a multipurpose fishing-rod enabling the aforesaid disadvantages to be remedied.

The multipurpose fishing-rod according to the invention is of the telescopic type with interior guides, and having a removable handle carrying the reel.

According to a first characteristic of the invention, the removable handle is axially hollow and has at its end a hollow cylindrical portion in which is mounted an internal axial reel, preferably of the fixed drum type with a retractable interior turning guide, this cylindrical portion being extended by a portion in the shape of a truncated cone in the end of which is fixed an axial guiding ring for the line, in such a way that the line, when taut during winding and unwinding, describes between the reel and the ring, a frustum of a cone whose angle is less than or equal to about 75°, and preferably less than or equal to 30°; the truncated portion is moreover surrounded by a substantially cylindrical portion intended to receive the telescoping ends of the rod; the region of the joint of the substantially cylindrical portion to the truncated portion is perforated for draining the water collected within the handle; a device is provided for the progressive braking and locking of the line.

In a particular embodiment of the rod of the invention, the braking device for the line comprises a pivoting ring carried by two diametric arms pivotally mounted within the truncated portion of the handle for rotation about an axis perpendicular to the axis of the handle, the line being threaded through the said rings; one of the carrying arms of this ring is extended to the exterior of the handle and is controlled by a flexible cable and urged by a spring which maintains the ring in a plane perpendicular to the axis of the handle.

In another embodiment of the rod, the braking device for the line comprises a ring mounted within the handle, for sliding parallel to the axis of the handle and outside the line; the ring is carried by two guide rods extended to the exterior of the handle and secured to a manipulating ring; the guide rods are constantly urged by a spring into the non-braking position.

In an alternative construction, the removable handle comprises a lateral gripping arm extended parallel to the handle and a lateral opening formed opposite this arm through which a finger may be inserted for locking the line.

The rod also has internal projecting longitudinal or annular ribs for preventing the line from catching on the wet walls of the handle.

The ends of the rod sections which receive another section have a divergent entrance reinforced by an extra thickness of material for receiving a removable locking ring longitudinally split having a projecting knurled rim extended by tongues of decreasing thickness.

The tip of the rod carries a guiding and wiping end piece for the line constituted by parallel rings connected together by supporting struts and diverging towards the exterior.

The invention will be described hereafter with reference to the accompanying drawings in which:

FIG. 1 is a view of a complete multipurpose fishing rod according to the invention, FIG. 2 is an elevational view of the section carrying the tip of the rod, FIG. 3 is a sectional elevation of the receiving end of one of the sections, FIG. 4 is a sectional elevation of another receiving end, FIG. 5 is a sectional elevation of the handle, FIG. 6 is a sectional elevation of an alternative handle according to the invention, and FIG. 7 is an elevation of a further variant of the handle according to the invention.

Referring to FIG. 1 of the drawings, the multi-purpose fishing rod according to the invention comprises at least two tubular truncated sections 1, 2 fitting one within the other, the first having a tip 3 retractable within the first section, and the last section being fixed to a handle 4 secured to a reel 5.

The section 2 (FIGS. 3 and 4), comprises a conical diverging entry piece 6 having a taper at least double that of the rod, reinforced by an extra thickness of material 7; this section is provided with projecting interior longitudinal and/or annular guiding ribs 8 defining between them a free sliding space of the section 1; these channels preferably have a width of from 1 to 3 mm. in order to produce a low friction sliding of the said section.

Moreover, the said section 1 can be locked within the other section in a partially retracted position, by a longitudinally slotted removable ring 9 of flexible plastic material having a projecting knurled rim 10 (FIG. 3) and tongues 11 of decreasing thickness, from about 2 mm. to 0.10 mm. received in spaces between the guiding ribs 8.

The base of the section 2 is locked in the handle 4.

This handle (FIG. 5) comprises a cylindrical hollow portion 4a within which is mounted an internal axial reel 5 of the fixed drum type and having an internal retractable rotatable line guide; this cylindrical portion is extended by a truncated portion 4b in the end of which is fixed a ring 12 for axial guiding of the line, the length of the truncated portion being such that the line taut during winding or unwinding describes, between the reel and the guiding ring a conical section of which the angle is less than or equal to about 75° and preferably less than or equal to 30° in order to avoid all excessive drag on the said line. The truncated portion is moreover connected to a substantially cylindrical portion 4c in such a way as to define with the internal wall of the cylindrical portion an annular hollow 4d, small holes 13 being formed at the base of this hollow for the evacuation of any running water accumulated in the hollow.

The hollow also serves as a bearing and centering element for the section 2 of the rod.

Braking and locking of the line 14 are ensured by a movable ring 15 carried by two diametric arms 16 turning in two low friction bearings 17 provided in the wall of the truncated portion 4b; one of the carrying arms is extended to the exterior of the handle by a flexible control cable 18; a spring 19 is provided to maintain the ring in a plane perpendicular to the axis of the handle; braking of the fishing line is obtained by rotating this movable ring through an angle from 0 to 90° and locking of the line by rotation through an angle of 90 to 180° according to the nature of the line.

In the position of the line ready for fising, the line leaving the reel is threaded through the movable ring 15 of the braking and locking device, the guide ring 12 of the truncated part 4b and passes through the section 2, the section 1 and the tip 3, and finally the end piece 20 for guiding and drying the line.

This end piece is constituted by parallel rings 20a connected together by connecting struts 20b which diverge from the end of the rod.

In the construction shown in FIG. 6, the braking device for the line comprises a ring 21 adapted to slide within the cylindrical portion 4a of the handle, parallel to the axis of this handle and outside the line 14. For this purpose, the ring is carried by two guide rods 22 slidably mounted in holes 23 formed in the wall of the handle; these guide rods are extended to the exterior of the handle and rigidly secured to a manipulating ring 24, springs 25 being provided to urge the braking ring 21 constantly into the non-braking position shown in FIG. 6.

In the construction of FIG. 7, a lateral gripping arm 26, which is preferably tubular, is connected to the removable handle 4, the arm being extended parallel to the axis of the handle and closed at its end by a knob 27; this arm is covered over a certain portion of its length by a sheath 28 to facilitate gripping.

A lateral opening 29 is formed in the truncated portion of the handle opposite to the arm 26 so that a finger may be inserted to lock the line by hand.

In the construction shown in FIG. 7 of the drawing, the reel is fixed directly in the cylindrical portion of the removable handle 4, for example by screwing. The reel can of course be fixed on the arm 26, with the aid of lateral fixing struts, for example, provided that the reel is maintained in the axis of the handle. In this case, the running water can flow through the space formed for this purpose between the internal wall of the handle and the reel.

Circular and longitudinal projecting ribs can also be provided on the internal walls of the handle to prevent the line from sticking on the walls when wet.

*Advantages*

The multi-purpose fishing-rod of the invention offers many advantages over conventional fishing-rods:

(1) A length of fishing rod badly gripped in the section within which it is received cannot, when it accidentally falls within the section, damage the reel, break the line or damage the silk.

(2) The fishing-rod as well as the end tip can be brought back into fishing condition.

(3) The ends of the rod can be adjusted to the desired length and locked without friction, this being useful because the frequent dummy casts in fly-fishing do not put the rod out of use.

(4) The rod can advantageously be used for all types of fishing such as casting wet and dry flies, and line casting fishing, simply by changing the bobbins of the reel, which can be easily done.

(5) The use of a removable handle having an axial reel means that the rod, the line and the reel are totally protected from all injurious snagging in difficult spots.

The lures themselves can no longer snag if they are protected during movements within the removable plastic end piece.

(6) With hollow rods having an interior path for the line, there is no longer any reason to fear sticking of the line against the walls wet from the rubbing of the line or silk, bad weather or an accidental immersion of the tip in the river, the water being drained to the exterior of the rod by the longitudinal and/or circular ribs; the fouling of the line or the silk, and consequently of the interior of the rod by dirty hands or clumsiness is no longer possible.

What I claim is:

1. A multipurpose telescopic fishing rod comprising telescopically related rod sections and having at least one rod section with interior guide means for the line and a removable handle fixed thereto, characterized in that the handle is axially hollow and has at one end a hollow cylindrical portion within which is mounted an internal axial reel, the cylindrical portion being extended by a truncated portion at the end of which is fixed a ring for axial guiding of the line, such that the line, taut during winding or unwinding, describes between the reel and the ring a conical section of which the angle is no more than 75°, the truncated portion being surrounded by a substantially cylindrical portion adapted to receive the telescoped ends of the rod sections, the region of the joint between the cylindrical and truncated portions being perforated to enable water collected within the handle to be evacuated, the rod being provided with a device for progressively braking and locking the line.

2. A rod according to claim 1 characterized in that the braking and locking device for the line comprises a pivoted ring carried by two diametric arms pivotally mounted within the truncated portion of the handle for rotation about an axis perpendicular to the axis of the handle, the line being threaded through the ring, one of the carrying arms for the ring being extended to the exterior of the handle, controlled by a flexible cable and urged by a spring which maintains the ring in a plane perpendicular to the axis of the handle.

3. A rod according to claim 1 characterized in that the braking device for the line comprises a ring mounted within the handle so as to slide parallel to the axis thereof and outside the line, the ring being carried by two guide rods extended to the exterior of the handle and secured to a manipulating ring, the guide rods being urged by a spring into the non-braking position.

4. A rod according to claim 1 characterized in that the handle comprises a lateral gripping arm extending parallel to the handle; the handle having a lateral opening formed opposite the arm for insertion of a finger to lock the line.

5. A rod according to claim 1 characterized in that the handle and rod sections have internal projecting longitudinal ribs for preventing sticking of the line therein.

6. A rod according to claim 5 in which the handle and the rod sections also have internal projecting annular ribs for preventing sticking of the line therein.

7. A rod according to claim 1 in which the handle and the rod sections have internal projecting annular ribs for preventing sticking of the line therein.

8. A rod ccording to claim 1 characterized in that the ends of the rod sections which receive another rod section comprise a diverging entry portion reinforced by an extra thickness of material, which receives a longitudinally split removable locking ring having a projecting knurled rim from which extend tongues of decreasing thickness.

9. A rod according to claim 1 characterized in that the tip of the rod carries an end piece for guiding and drying the line, the end piece being constituted by parallel rings connected together by struts which diverge towards the free end of the rod.

References Cited

UNITED STATES PATENTS

| 2,957,264 | 10/1960 | Ruff | 43—20 |
| 734,870 | 7/1903 | Hoglund | 43—20 |
| 3,190,578 | 6/1965 | Kondo | 43—20 X |
| 3,314,186 | 4/1967 | Vivelros | 43—18 |
| 3,325,938 | 6/1967 | Minera | 43—18 |

WARNER H. CAMP, *Primary Examiner.*

U.S. Cl. X.R.

43—20